Oct. 21, 1969  R. T. BOSWORTH  3,474,081
METHYL METHACRYLATE POLYMER AND PROCESS FOR MAKING SAME
Filed March 14, 1966
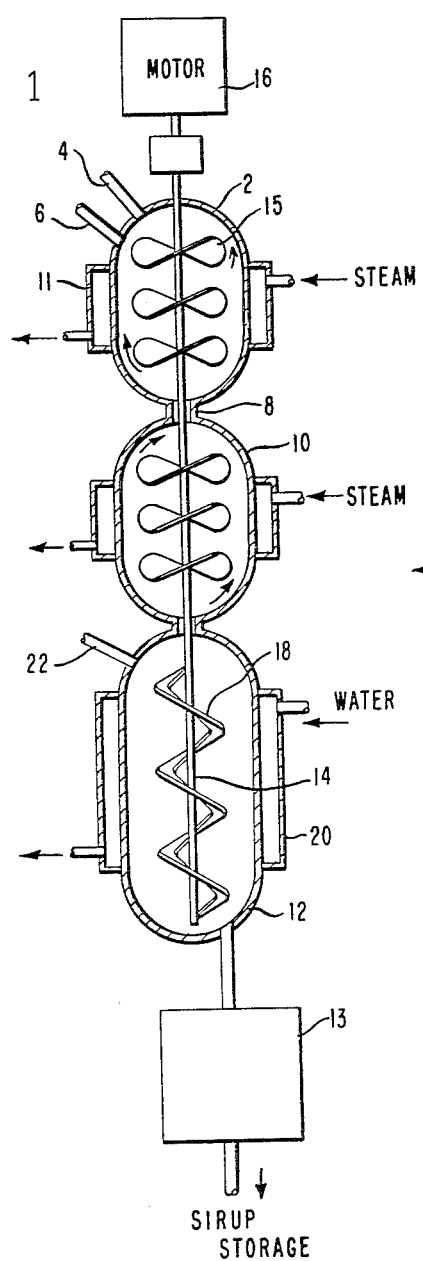
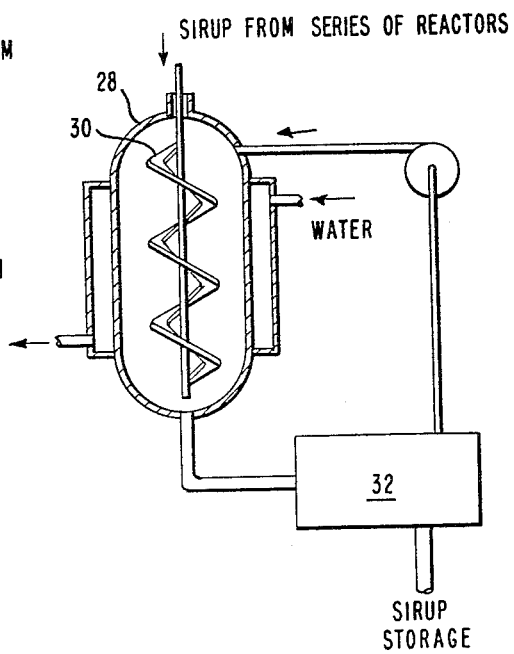
INVENTOR
ROBERT T. BOSWORTH
BY *Edwin Tocker*
ATTORNEY United States Patent Office 3,474,081
Patented Oct. 21, 1969

3,474,081
METHYL METHACRYLATE POLYMER AND
PROCESS FOR MAKING SAME
Robert T. Bosworth, Vienna, W. Va., assignor to E. I.
du Pont de Nemours and Company, Wilmington, Del.,
a corporation of Delaware
Filed Mar. 14, 1966, Ser. No. 534,087
Int. Cl. C08f 1/04, 3/68
U.S. Cl. 260—89.5                          3 Claims

ABSTRACT OF THE DISCLOSURE

An improved methyl methacrylate polymer and monomer sirup having controlled molecular weight and excellent storage stability can be produced by a process which comprises exposing a mixture initiator and monomer to a constant polymerization environment for sufficient time to allow 40–90% by weight of the polymer appearing in the final sirup to form and then allowing said sirup to undergo at least one more constant environment polymerization to complete the polymerization and to reduce the initiator level to below five parts per million and then lowering the temperature of the sirup to a temperature at which the residual initiator is substantially inactive.

---

This invention relates to the manufacture of methyl methacrylate polymer-in-monomer sirups, and more particularly, to an improved process for the manufacture of such sirups and to the sirups as compositions of matter obtained by the improved process.

Articles of methyl methacrylate polymer are well known and have wide utility. Such articles are generally formed from a flowable solution of methyl methacrylate polymer in the corresponding monomer, this solution being commonly called a casting sirup. The casting sirup is poured into a mold, and the monomer in the sirup is polymerized to give a solid article in the shape of the mold. Some of the requirements of the casting sirup are—it should have sufficiently low viscosity so that it readily pours and fills every corner of the particular mold being used. The sirup should also contain as high a proportion of polymer as possible in order to minimize the amount of monomer present in the sirup and thus, the amount of heat evolved during the polymerization of this monomer to get a solid article from the sirup. Further, the casting sirup should have high storage stability and should give a solid article which is free of discoloration.

The casting sirup manufactured heretofore has not always satisfactorily met the foregoing requirements. The casting sirup has been made in a batch process involving the introduction of monomer and an amount of free radical polymerization initiator to give the proportion of polymer desired into a kettle and carrying out the polymerization at elevated temperature and for sufficient time to reduce the amount of active initiator to a negligible amount. The kettle is then emptied of sirup and the batch process is repeated. The polymerization is carried out for a sufficient time to reduce the content of residual initiator in the sirup to a negligible amount to avoid further polymerization in storage and thus a change in the viscosity of the sirup. Unfortunately, the time required to reach the residual initiator level during batch polymerization leads to the formation of polymer having an excessively high molecular weight. This causes the sirup to have a viscosity which is disproportionately high relative to the amount of polymer in the sirup. Chain transfer agents have been added during the batch preparation of the sirup to minimize the formation of high molecular weight polymer. Such agents, however, reduce the storage stability of the casting sirup and may cause some discoloration in articles prepared therefrom. Another draw-back is that the chain transfer agent reacts with some of the desired curing agents used for completing polymerization in the casting operation.

Attempts at manufacture of the sirup by continuously passing monomer and initiator through a reactor, such as disclosed in British Pat. No. 937,215 have not satisfactorily overcome the foregoing described disadvantages of the batch process and the sirups obtained thereby, and have introduced a further difficulty in the manufacture of the sirup, namely, plugging of the elongated reactor required to obtain sufficient residence time to give negligible residual initiator. The plugging is caused by adhesion of polymer to the reactor wall and continued polymerization of the adhered polymer into a solid impervious mass.

The present invention provides a process which overcomes many of the disadvantages of the prior art processes and gives a polymer-in-monomer sirup having desirable properties. The process comprises exposing a mixture of initiator and monomer to a first environment of constant polymerization conditions throughout for a time to allow from 40 to 95% by weight of the polymer appearing in the final sirup to form, then exposing the resultant polymerization medium to at least one subsequent environment of the constant polymerization conditions to form the remainder of the polymer to appear in the final sirup and in which residual initiator is negligible, and thereafter cooling the polymerization medium resulting from the subsequent polymerization conditions to a temperature at which the residual initiator is substantially inactive.

Each constant environment is obtained by continuously adding the reacting ingredients to a reaction zone and continuously withdrawing the reaction products therefrom, but maintaining the reaction medium within the zone at substantially uniform concentration throughout by vigorous agitation. The agitation must be turbulent and systematic to prevent polymer adhesion as well as to maintain the environment constant. Because the polymerization initiator added to the first environment is rapidly used up (decays), the concentration of the initiator diminishes in large increments progressively from environment to environment. Thus, the initiator concentration in the first environment is high, while in a successive environment, the initiator concentration is relatively low. Nevertheless, a constant level of initiator concentration in each environment is obtained by adjusting the feed rate to correspond to a certain rate of decay of the initiator, taking into account the withdrawal rate from the environment.

Because polymer produced in the presence of high concentration of initiator has a low molecular weight while polymer produced in the presence of low concentration of initiator has a relatively high molecular weight, the sequential constant environment process of the present invention enables the average molecular weight of the polymer to be controlled without the use of chain transfer agent, by control of the exposure time and temperature of exposure of monomer at each of the initiator concentrations in the series of environments. Preferably, the last constant environment has an initiator concentration of no greater than 5 p.p.m. based on the weight of the sirup.

The polymer-in-monomer sirup produced by the process of this invention can be free of chain transfer agent and has a negligible residual initiator concentration generally no greater than five p.p.m. which gives a storage stability of at least about one month (31 days). If desired, a polymerization inhibitor can also be added to the sirup to increase the storage stability of the sirup to at least about three months. Since the polymer in the polymer-inmonomer sirup is formed in the presence of at least two different levels of initiator concentration, the polymer consists of at least two molecular weight fractions, one being of relatively high molecular weight and the other being of relatively low molecular weight, with the weight average molecular weight of the high molecular weight fraction being at least about twice the weight average molecular weight of the low molecular weight fraction. The low molecular weight fraction comprises from 40 to 95% by weight of the polymer in the polymer-in-monomer sirup. At the higher contents, within this range, of low molecular weight fraction, a high solids content at relatively low and useful viscosity levels for the sirup is attained.

The present invention will be better understood by reference to the following detailed decription and to the drawings in which:

FIG. 1 is a schematic representation of representative equipment in which the process of the invention can be conducted; and FIG. 2 is an alternative cooler arrangement for use in place of the cooler shown in FIG. 1.

In FIGURE 1 is shown a first polymerization reactor 2 equipped with an inlet 4 and an inlet 6 for feeding monomer and polymerization initiator, respectively, into the reactor 2. An outlet 8 of reactor 2 serves also as the inlet to a second polymerization reactor 10 which receives the discharge of reactor 2. At least two reactors are required; additional reactors (not shown) can also be connected in series with reactors 2 and 10. Each reactor has a steam jacket 11. The outlet of the final reactor in the series discharges first into a cooler 12 in which the sirup made in the preceding reactors is cooled to a temperature preferably no higher than 80° C. and then into a scondary cooler 13. Vigorous agitation of the contents of the reactors 2 and 10 and the like is obtained by propellers 15 and mounted on a common shaft 14 which is driven by a motor 16. The propellers 15 drive the contents of the reactors downward along the shaft 14 and upward along the reactor walls as shown by the arrows in the drawing, only to again be driven downward again by propellers 15. This high degree of systematic and turbulent agitation gives the constant environment, in which samples taken from virtually any point within the reactor will have substantially the same composition. The sidewalls of reactors 2, 10 and the like can be baffled with either vertically mounted or inclined baffles to insure high turbulence throughout the reactor.

In the embodiment of FIG. 1, the shaft 14 extends into the cooler 12, and mounted on this shaft is a helical agitation blade 18. This blade causes the sirup to flow against the walls of the cooler 12 which are cooled by a water jacket 20. The cooled sirup is continuously discharged from the cooler 13 and can then be transferred to sirup storage. Cooler 12 is equipped with an inlet 22 for polymerization inhibitor.

An alternative cooling arrangement is shown in FIG. 2 in which the cooler 28, equipped with a helical agitation blade 30 as in FIG. 1, receives the polymer-in-monomer sirup from the last polymerization reactor and passes it into a chiller 32 which cools the material down to, for example, 30° C. The discharge from the chiller 32 is subdivided into two streams, one of which goes to sirup storage and the other of which directs cooled sirup back into the cooler 28 in such a fashion as to cool the sirup introduced from the last reactor. Sufficient chilled sirup is returned to the cooler to mix with and cool the newly introduced sirup to a temperature below 80° C. Typically, the ratio of recycled chilled sirup to newly formed sirup is about 4:1. In this embodiment, the chiller 28 may not require a water jacket, and an inlet for polymerization inhibitor can be added to the cooler 28.

In operation, monomer and initiator are continuously introduced by their respective inlets into reactor 2 and polymerization conditions are established, e.g., temperature and residence time so that the desired proportion of the polymer is formed. The polymerization medium or sirup from the reactor 2 is continuously withdrawn therefrom and passed to reactor 10, for further polymerization if additional reactors are used, or completion of the polymerization, insofar as the polymer in the sirup is concerned, if reactor 10 is the last reactor in the series. The contents of each reactor are vigorously agitated. The resultant sirup is then continuously cooled to a temperature preferably no higher than 80° C. To illustrate the effect of the rapid decay of the initiator, the rate of initiator feed may be equivalent to 1000 p.p.m. based on the rate of the monomer feed. However, because of decay, the constant environment initiator concentration in reactor 2 may only be 300 p.p.m. based on the weight of the contents of the reactor. The constant environment initiator concentration in reactor 10 can be adjusted by control of the temperature and concentration of initiator in reactor 2 to be no greater than 5 p.p.m. in order that the final sirup have a similarly low content of residual initiator.

The polymer component of sirups thusly produced can consist of methyl methacrylate polymer including the homopolymer and copolymers thereof with less than 40% by weight of other copolymerizable ethylenically unsaturated monomers such as acrylonitrile, ethylene, butadiene, vinyl acetate, styrene, 2-methyl styrene, lower alkyl acrylates, e.g., n-butyl methacrylate. Monomer or mixture of monomers corresponding to the desired polymer component is used as the initial mnomer feed, such as to reactor 2, in the process of this invention.

Suitable initiators include any of the free radical polymerization initiators conventionally employed to polymerize methyl methacrylate and the like. Preferred initiators are those which have a short half life, viz., less than about one-half of a minute at the polymerization temperature employed. Suitable initiators include $\alpha,\alpha'$-azobisisobutyronitrile, benzoyl peroxide, lauryl peroxide, and di-t-butyl peroxide. The conventional practice of froming a concentrated solution of initiator in monomer and then adding this solution along with a separate stream of monomer to the polymerization vessel can be followed in the practice of the process of the present invention. Initiator concentrations of from 100 to 5000 p.p.m. based on the weight of total monomer can be used.

With respect to operating details, each of the constant environmnts, e.g. reactors 2 and 10, are operated under a pressure of 30 to 400 p.s.i.g., and preferably 70 to 100 p.s.i.g.; and a temperature of 100 to 220° C., and preferably 135–165° C. The residence time in each constant environments, e.g., reactors 2 and 10, are operated under a and the feed rate of the monomers. Residence time and initiator concentration can be adjusted to give the desired polymer content and molecular weight in the sirup product. Feed rates are preferably adjusted so that the residence time in the first environment, e.g. reactor 2, is from 0.25 minute to less than 100 times the half life of the initiator under the process conditions employed. The total residence time in all the environments should be greater than 100 times the half life of the initiator at the reaction temperature in order to have no greater than 5 p.p.m. of residual initiator in the sirup. Generally, residence times in each environment will be between 0.25 and 30 minutes. Preferably 75 to 90% by weight of the polymer is formed in the first environment.

The initiator concentration can be calculated as follows:

$$S = \frac{I}{(kV + F/D)D/F}$$

where $S$ is steady state concentration in moles/liter in the constant environment, $I$ is initial concentration moles/liter, $V$ is volume in cc., $F$ is feed rate in g./min., $D$ is density in g./cc. of the sirup and $k$, in min.$^{-1}$, is initiator decomposition constant. $k$ can be determined by the method described in U.S. Pat. No. 3,153,022, Calkins et al. This calculation is repeated for each stage, letting the initial concentration become the concentration entering from the previous stage.

The polymer-in-monomer sirup made by the foregoing described process will generally contain from about 15 to 50% of polymer based on the weight of the sirup and will have a bulk viscosity of ½ to 50 poises at 25° C. or preferably from 1 to 20 poises, the range desired by most casting fabricators. The polymer in the sirup will generally have an inherent viscosity of from 0.25 to 1.0 and is characterized by at least two peaks in the molecular weight distribution of the polymer component, the number of peaks varying with the number of successive constant environments employed. The weight average molecular weights represented by the peaks increased by a multiplier of about 2 from peak to peak, starting with the peak representing the lowest weight average molecular weight. The inherent viscosities given in this specification are determined at 20° C. in a chloroform solution at a concentration of 0.5 g./100 ml. By adjusting the polymerization conditions so that most of the polymer is produced in the presence of a high concentration of catalyst, most of the polymer will be of low molecular weight. When the last environment is reached, in which the steady state concentration of initiator is low, only a relatively small amount of high molecular weight polymer is formed and the residual initiator is low.

Because of the molecular weight control obtained by the process of this invention, a chain transfer agent need not be employed for this purpose during the polymerization. However, a chain transfer agent can be used in amounts from about 0.1 to 0.4% of the weight of monomer to reduce terminal unsaturation in the polymer and to narrow the molecular weight distribution. Examples of such agents or telogens include glycol dimercaptoacetate, lauryl mercaptan, and n-butyl mercaptan. To enhance the storage stability of the sirup, a polymerization inhibitor can be added in a stabilizing amount to the sirup, e.g. 10–150 p.p.m. based on the weight of the sirup. Examples of inhibitors include quinone, hydroquinone, and hindered alkyl substituted phenols such as 2,4-dimethyl-6-t-butyl phenol.

The sirups of this invention are useful for casting solid articles such as sheets. The curing agents used in conventional casting sirups can be used in the sirup of this invention.

In the following examples, parts and percents are by weight unless otherwise indicated.

EXAMPLE 1

The apparatus was two-stage continuous siruping reactor system as described in FIG. 1, in which each of the reactors 2 and 10 were equipped with propeller agitator as shown and had a volume of 350±5 cc., with the last reactor discharging into the recycle cooling arrangement shown in FIG. 2. Reactor 2 was equipped with an inlet for methyl methacrylate which was added at the rate of 80 cc./min. and with an inlet for initiator, namely α,α'-azobisisobutyronitrile, which was added as a 0.0914% solution of initiator in methyl methacrylate at the rate of 15.3 cc./min. The temperature of the monomer feed was 132° C. and of the initiator solution feed was 25° C. The temperature in each reactor was 151° C. and the pressure in each reactor was 80 p.s.i.g. The recycle ratio was adjusted to quench the sirup to 44° C. in the cooler 28 and to 20° C. leaving the chiller 32. The residence time in each reactor was about 3.1 minute. The resultant sirup of polymethyl methacrylate in methyl methacrylate monomer had a Brookfield bulk viscosity at 25° C. of 13.6 poises, a polymer content of 18.2%, and a residual initiator content of 0.078 p.p.m. The polymer had an average inherent viscosity of 0.994 (corresponds to a weight average molecular weight of about 335,000). The polymer consisted of a high molecular weight fraction having a weight average molecular weight of about 701,000 and a low molecular weight fraction having a weight average molecular weight of about 268,000. About 87% of the polymer was formed in the first stage reactor 2, this being the proportion of the low molecular weight fraction in the polymer.

EXAMPLE 2

The apparatus of Example 1 was used except that the cooler of FIG. 1 was used in place of the cooling arrangement of FIG. 2. The methyl methacrylate feed was preheated to 90° C. and fed to reactor 2 at the rate of 185 cc./min. The initiator was prepared as a 1.34% solution of α,α'-azobisisobutyronitrile in methyl methacrylate and added to reactor at a temperature of 25° C. and feed rate of 18.6 cc./min. Each reactor was maintained at 151° C. and 80 p.s.i.g. The cooler 12 quenched the sirup to a temperature between 67 to 72° C. The residence time in each reactor was about 1.65 min. The sirup had a Brookfield bulk viscosity at 25° C. of 26 poises, a residual initiator level of 1.92 p.p.m., and contained about 34.2% polymethylmethacrylate having an inherent viscosity of about 0.395 corresponding to a weight average molecular weight of about 84,000. About 85% of the polymer low molecular weight fraction formed in reactor 2. The high molecular weight fraction had a weight average molecular weight of about 172,000 and the low molecular weight fraction had a weight average molecular weight of about 64,000.

EXAMPLE 3

The apparatus of Example 1 was used. The initiator was prepared as a 4% solution of α,α'-azobisisobutyronitrile in methyl methacrylate and fed to reactor 2 at 25° C. and at a rate of 15 cc./min. Methyl methacrylate at 83–88° C. was added to the reactor at a rate of 340.8 cc./min. The reactors were maintained at 163° C. and 110–115 p.s.i.g. The recycle cooling was arranged to cool the sirup to 56 to 64° C. and to chill it to 35–36° C. Residence time in each reactor was 0.82 min. The sirup had a residual initiator of 2.53 p.p.m., a Brookfield bulk viscosity at 25° C. of about 10 poises, and polymer content of 35.5%. The polymer had an inherent viscosity of 0.28 corresponding to a molecular weight of about 50,000. About 87% of the polymer was low molecular weight fraction, formed in reactor 2. The high molecular weight fraction had a weight average molecular weight of about 112,600 and the low molecular weight fraction had a weight average molecular weight of about 37,000.

EXAMPLE 4

The apparatus of FIG. 1 was used in which four reactors were connected in series. The initiator used was α,α'-azobisisobutyronitrile in an 0.98% solution in methyl methylacrylate and feed to the first reactor at 25° C. at a rate of 11.2 cc./min. Methyl methacrylate at about 87° C. was fed to the first reactor at a rate of 255 cc./min. The reactors were maintained at 138° C. and 60 p.s.i.g. The sirup was cooled to 64° C. in a cooler having marine propellors. The sirup contained 23.7% polymer having an inherent viscosity of 0.69.

EXAMPLE 5

The apparatus of FIG. 1 was used in which two reactor stages were connected in series. The initiator used was α,α'-azobisisobutyronitrile in a 1.34% solution in methyl methacrylate and fed to the first reactor at a rate of 17.2 cc./min. at 25° C. A mixture of 2.5% ethyl acrylate in methyl methacrylate was fed at a rate of 208 cc./min. and heated to 93 to 96° C. before entering the first stage. The first reactor was at 151° C. and the second at 155° C., both being at 70–75 p.s.i.g. The product was cooled to 72° C. in the helical cooler of FIG. 1. The sirup contained 29.5% polymer and had a Brookfield bulk viscosity of 6.3 poise at 25° C. The polymer in the sirup had an inherent viscosity of 0.420 (about 80,000 weight average molecular weight). The polymer separated from this sirup had a measured ethyl acrylate content of 1.3%. The sirup was inhibited with 50 p.p.m. (2,4-dimethyl-t-butyl) phenol inhibitor added in the cooler.

EXAMPLE 6

The apparatus of FIG. 1 having 2 reactor stages was connected to a recycle cooling system as in FIG. 2. The initiator was $\alpha,\alpha'$-azobisisobutyronitrile in a 1.342% solution in methyl methacrylate and fed to the first reactor at a rate of 17.6 cc./min. at 25° C. A mixture of 9.0% ethyl acrylate in methyl methacrylate was fed at a rate of 215 cc./min., heated to 96–98° C. and injected in the first reactor. The reactors were at 151–152° C. and a pressure of 84–86 p.s.i.g. Polymer content was 23 to 26.3% and Brookfield bulk viscosity of the polymer in the resultant sirup was 0.499–0.503 (about 110,000 weight average molecular weight).

EXAMPLE 7

The apparatus of Example 6 was used in this example. A solution of 0.657% $\alpha,\alpha'$-azobisisobutyronitrile and 2.63% glycol dimercaptoacetate in methyl methacrylate was prepared. Each reactor temperature was maintained at a temperature of about 151° C. by preheating the methyl methacrylate feed to 55–65° C. by manual control, and the pressure of each reactor was 80 p.s.i. The feed rates were 82.3 cc./min. of monomer and 11.6 cc./min. of initiator-mercaptan solution, corresponding to 0.16 mole percent of mercaptan in the feed. The recycle cooling ratio was adjusted to quench the sirup to 45° C. in the cooler, while the product was discharged at 25° C. from the chiller. Measurements on the sirup at 25° C. showed the bulk viscosity to be 16.6 poise, the solids content to be 36.4% polymer, and the polymer inherent viscosity to be 0.304 (57,000 molecular weight). The residence time/stage was about 3.26 min., and the sirup had a residual initiator concentration of 0.423 p.p.m., a residual mercaptan concentration of 2110 p.p.m. and an average molecular weight distribution of 2.04. The presence of mercaptan reduced the fraction of unsaturated end groups from 50% to about 20%.

As many apparently widely different embodiments of this invention may be made without departing from the spirit and scope thereof, it is to be understood that this invention is not limited to the specific embodiments thereof except as defined in the appended claims.

What is claimed is:
1. A process for preparing a sirup of methyl methacrylate polymer in the corresponding monomer, the polymer representing from 15 to 50 percent of the weight of the sirup, comprising continuously adding a mixture of from 100 to 5000 p.p.m. based on the weight of the total of said monomer to be added of free radical polymerization initiator and said monomer to a reactor having an environment of constant polymerization conditions to form from 40 to 95 percent by weight of said polymer, continuously withdrawing and exposing the resultant polymerization medium to at least one subsequent environment of constant polymerization conditions by adding said resultant polymerization medium to at least one subsequent reactor having an environment of constant polymerization conditions to form the remainder of said polymer and to reduce residual initiator to below 5 p.p.m, each of said reactors are held at a temperature of from 100 to 220° C. and a pressure of 30 to 400 p.s.i.g., the contents of each of said reactors is maintained in turbulent agitation to obtain said environment of constant polymerization conditions in each, continuously withdrawing the subsequent resulting sirup from said subsequent reactor, and thereafter cooling the sirup resulting from said subsequent environment to a temperature below 80° C.

2. The process of claim 1 wherein the exposure of said monomer and initiator in said first mentioned environment is from 0.25 to 30 minutes.

3. The process of claim 1 wherein the exposure of said monomer and initiator in said first mentioned environment is from one-half minute to less than 100 times the half-life of said initiator under said polymerization conditions therein.

References Cited

UNITED STATES PATENTS

| | | |
|---|---|---|
| 2,204,517 | 6/1940 | Strain. |
| 2,391,393 | 12/1945 | Coffman et al. |
| 2,689,982 | 9/1954 | Chynoweth. |
| 3,084,068 | 4/1963 | Munn. |
| 3,234,303 | 2/1966 | Bild et al. |
| 3,252,950 | 5/1966 | Terenzi et al. |

HARRY WONG, Jr., Primary Examiner

U.S. Cl. X.R.

260—83.5, 85.5, 86.1, 86.7

PO-1050
(5/69)

UNITED STATES PATENT OFFICE
CERTIFICATE OF CORRECTION

Patent No. 3,474,081         Dated October 21, 1969

Inventor(s) Robert T. Bosworth

It is certified that error appears in the above-identified patent and that said Letters Patent are hereby corrected as shown below:

Col. 4, line 29, "mnomer" should be --- monomer ---. Line 50, "environments, e.g., reactors 2 and 10, are operated under a" should read --- environment will be determined by the size of the reactors ---.

SIGNED AND
SEALED
FEB 17 1970

(SEAL)
Attest:

Edward M. Fletcher, Jr.
Attesting Officer

WILLIAM E. SCHUYLER, JR.
Commissioner of Patents